(12) United States Patent
Ledbetter

(10) Patent No.: US 8,605,205 B2
(45) Date of Patent: Dec. 10, 2013

(54) DISPLAY AS LIGHTING FOR PHOTOS OR VIDEO

(75) Inventor: Carl Ledbetter, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 101 days.

(21) Appl. No.: 13/210,082

(22) Filed: Aug. 15, 2011

(65) Prior Publication Data

US 2013/0044249 A1    Feb. 21, 2013

(51) Int. Cl.
*H04N 5/222* (2006.01)
*H04N 5/225* (2006.01)

(52) U.S. Cl.
USPC ............... 348/370; 348/371; 348/207.1

(58) Field of Classification Search
USPC ............ 348/207.1, 207.11, 370, 371
See application file for complete search history.

(56) References Cited

U.S. PATENT DOCUMENTS

| | | | |
|---|---|---|---|
| 6,078,302 A | 6/2000 | Suzuki | |
| 7,631,979 B1 * | 12/2009 | Brown et al. | 362/3 |
| 2003/0001958 A1 | 1/2003 | Hoshuyama | |
| 2004/0239799 A1 * | 12/2004 | Suzuki et al. | 348/370 |
| 2005/0117062 A1 | 6/2005 | Chien et al. | |
| 2007/0081094 A1 * | 4/2007 | Ciudad et al. | 348/371 |
| 2007/0081102 A1 | 4/2007 | Ramanath et al. | |
| 2008/0043138 A1 | 2/2008 | Tsai | |
| 2008/0165267 A1 | 7/2008 | Cok | |
| 2008/0180553 A1 | 7/2008 | Hassan-Shafique et al. | |
| 2008/0252737 A1 | 10/2008 | Morehouse et al. | |
| 2008/0261693 A1 | 10/2008 | Zalewski | |
| 2009/0160945 A1 * | 6/2009 | Chung et al. | 348/207.1 |
| 2009/0251560 A1 * | 10/2009 | Azar et al. | 348/222.1 |
| 2010/0157139 A1 | 6/2010 | Velarde et al. | |
| 2010/0201823 A1 | 8/2010 | Zhang et al. | |
| 2011/0034244 A1 | 2/2011 | Marks et al. | |

OTHER PUBLICATIONS

Balasubramanian et al. "A Novel Fuzzy Logic Based Controller to Adjust the Brightness of the Television Screen with Respect to Surrounding Light". World Academy of Science, Engineering and Technology, Mar. 2008, Issue 39, pp. 188-191.

International Search Report and Written Opinion dated Jan. 30, 2013 in International Patent Application No. PCT/US2012/050818.

* cited by examiner

*Primary Examiner* — Kelly L Jerabek
(74) *Attorney, Agent, or Firm* — Vierra Magen Marcus LLP

(57) ABSTRACT

A system and method are disclosed for using one or more displays as a lighting source to illuminate a field of view captured by an image capture device. An image capture engine may be provided for ensuring synchronization of the one or more displays with the image capture device so that the one or more displays may be illuminated concurrently with capturing the image by the image capture device. In one example, the image capture engine flashes the display to white light for capture of a single frame of image data.

17 Claims, 10 Drawing Sheets

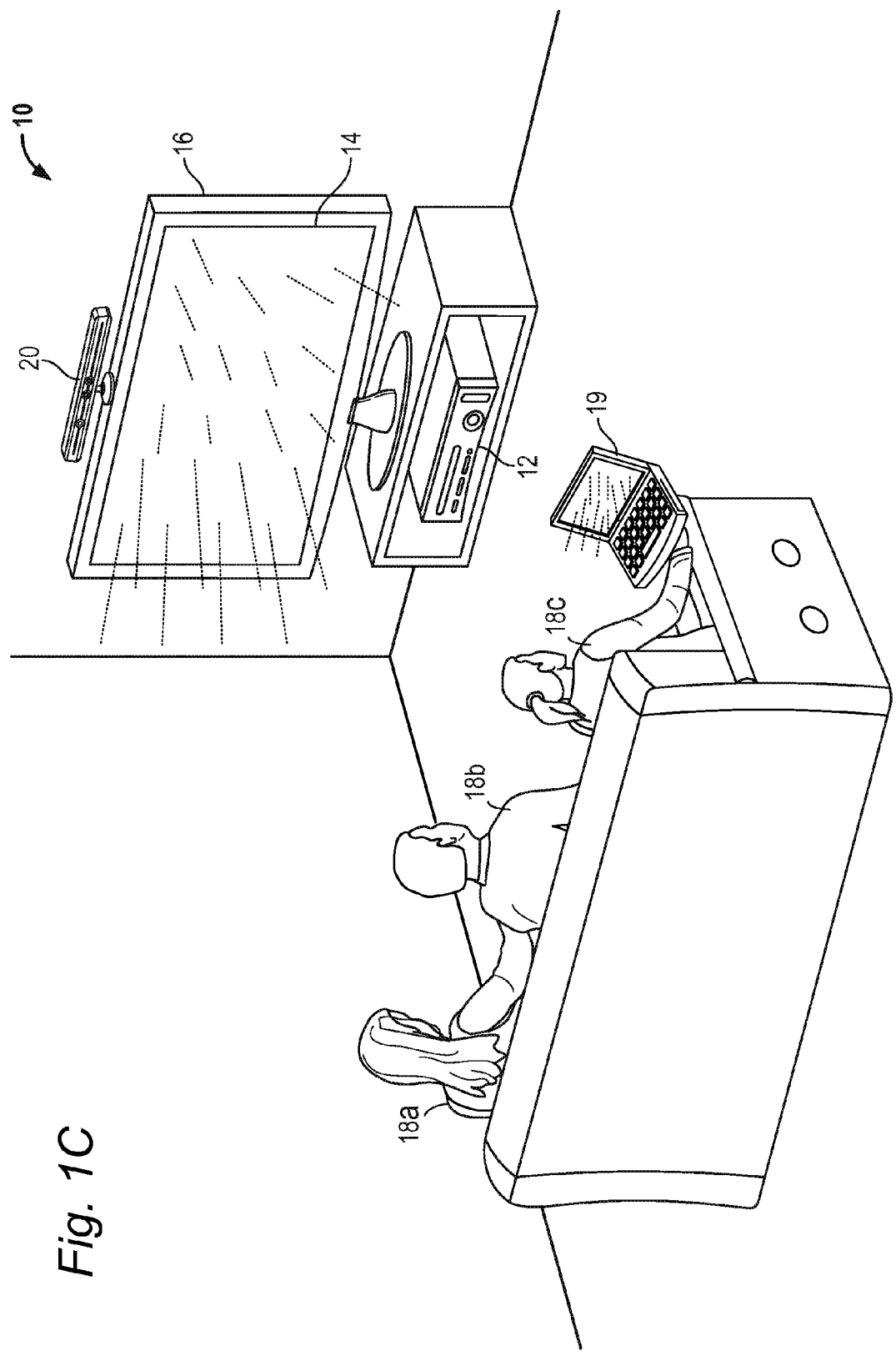

DISPLAY AS LIGHTING FOR PHOTOS OR VIDEO

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, raw joint data and user gestures are detected, interpreted and used to control game characters or other aspects of an application.

Some gaming or other NUI applications have software routines which give users the option to pose and have their picture taken. However, it may happen that there is low ambient light around users when their image is to be captured. In such scenarios, the captured image may be too dark.

SUMMARY

Disclosed herein are systems and methods for using one or more displays as a flash, or lighting source, during image capture by an image capture device associated with the one or more displays. In one example, the present system may be implemented using a NUI system including an image capture device, one or more displays, and a computing device for controlling the image capture device and one or more displays. In such examples, a NUI application running on the computing device may have an image capture software engine for capturing and storing an image of users within the field of view of the capture device. In accordance with the system of the present disclosure, the image capture engine may send an instruction to the display to set each pixel to white when the image is to be captured. This white light from all pixels combined helps illuminate the user(s) and/or other objects in the field of view at the time of image capture.

In embodiments, the image capture engine flashes the display to white light for capture of a single frame of image data. However, in further embodiments, the image capture engine alters the brightness and/or contrast of the display to capture multiple frames of video image data. In such embodiments, the pixels of the display may all display white light. However, where an image is captured over time, there may be an image being displayed on the display which preferably does not get interrupted while the video image is captured. In such examples, the screen may be divided in some manner so that some pixels display white light, while other pixels display the image. Additionally or alternatively, the contrast of the pixels displaying the image may be altered to increase the luminance from those pixels and the light in the field of view.

In embodiments, there may be a single display which is used to light a captured image. In further embodiments, there may be more than one display. For example, there may be one or more available devices, each having a display, that are networked or paired with the computing device running the image capture engine. In such examples, each of the displays of the various networked or paired devices may flash white light upon the image capture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1C illustrates a still further example embodiment of a target recognition, analysis, and tracking system with the pixels of multiple displays set to produce white light during an image capture.

DETAILED DESCRIPTION

Embodiments of the present technology will now be described with reference to FIGS. 1A-7B which in general relate to a system for using one or more displays as a lighting source to illuminate a field of view (FOV) captured by an image capture device. In one example explained hereinafter, the present system may be implemented via a NUI system including an image capture device, one or more displays, and a computing device for controlling the image capture device and display. However, it is understood that the system of the present disclosure may be used with a variety of platforms that do not employ a NUI system. Such systems may in general include a capture device such as a still frame and/or video camera and one or more displays.

Figure 1A:
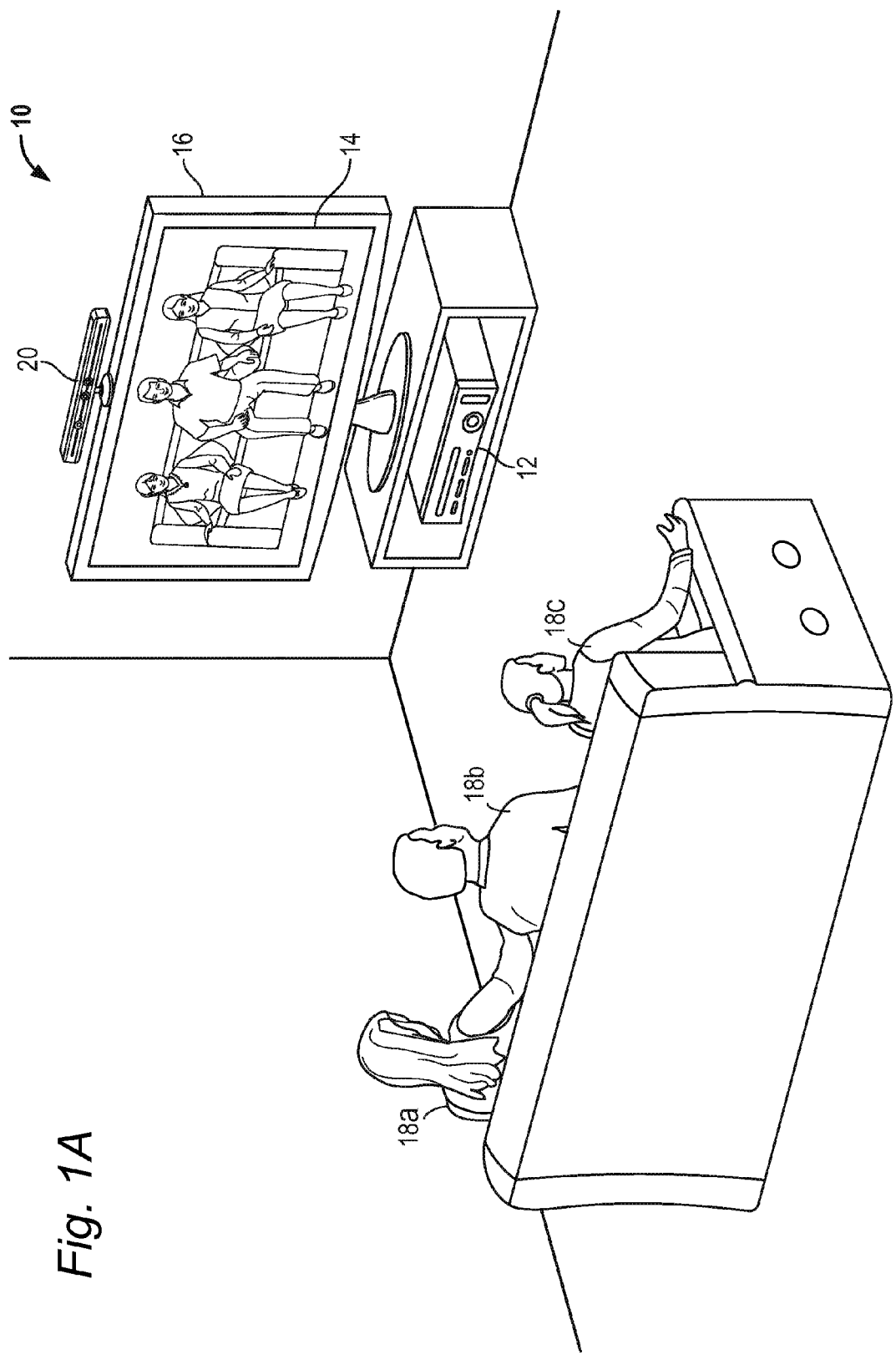
FIG. 1A illustrates an example embodiment of a target recognition, analysis, and tracking system.
Figure 1B:
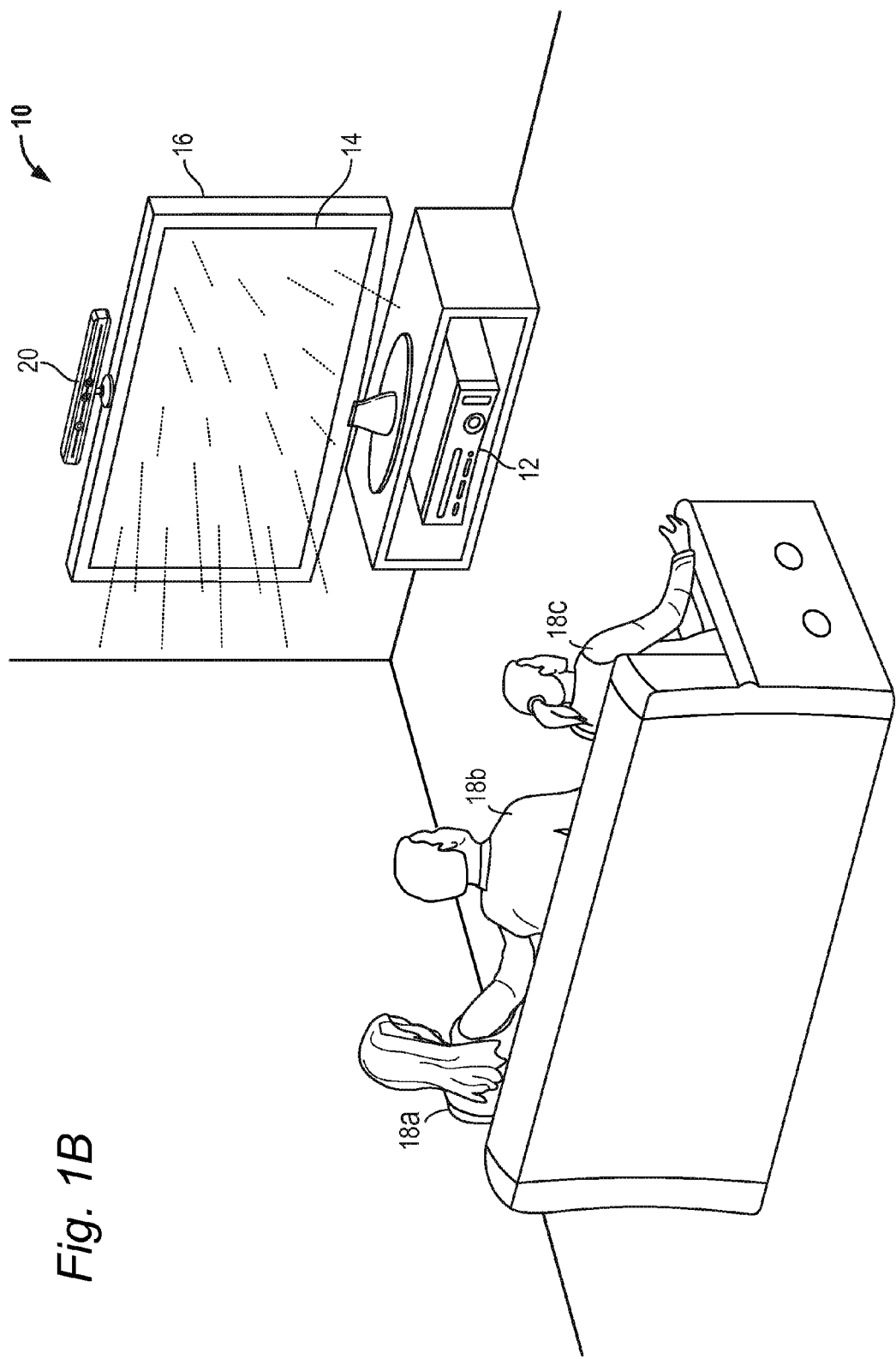
FIG. 1B illustrates a further example embodiment of a target recognition, analysis, and tracking system with the pixels of the display set to produce white light during an image capture.
Figure 2:
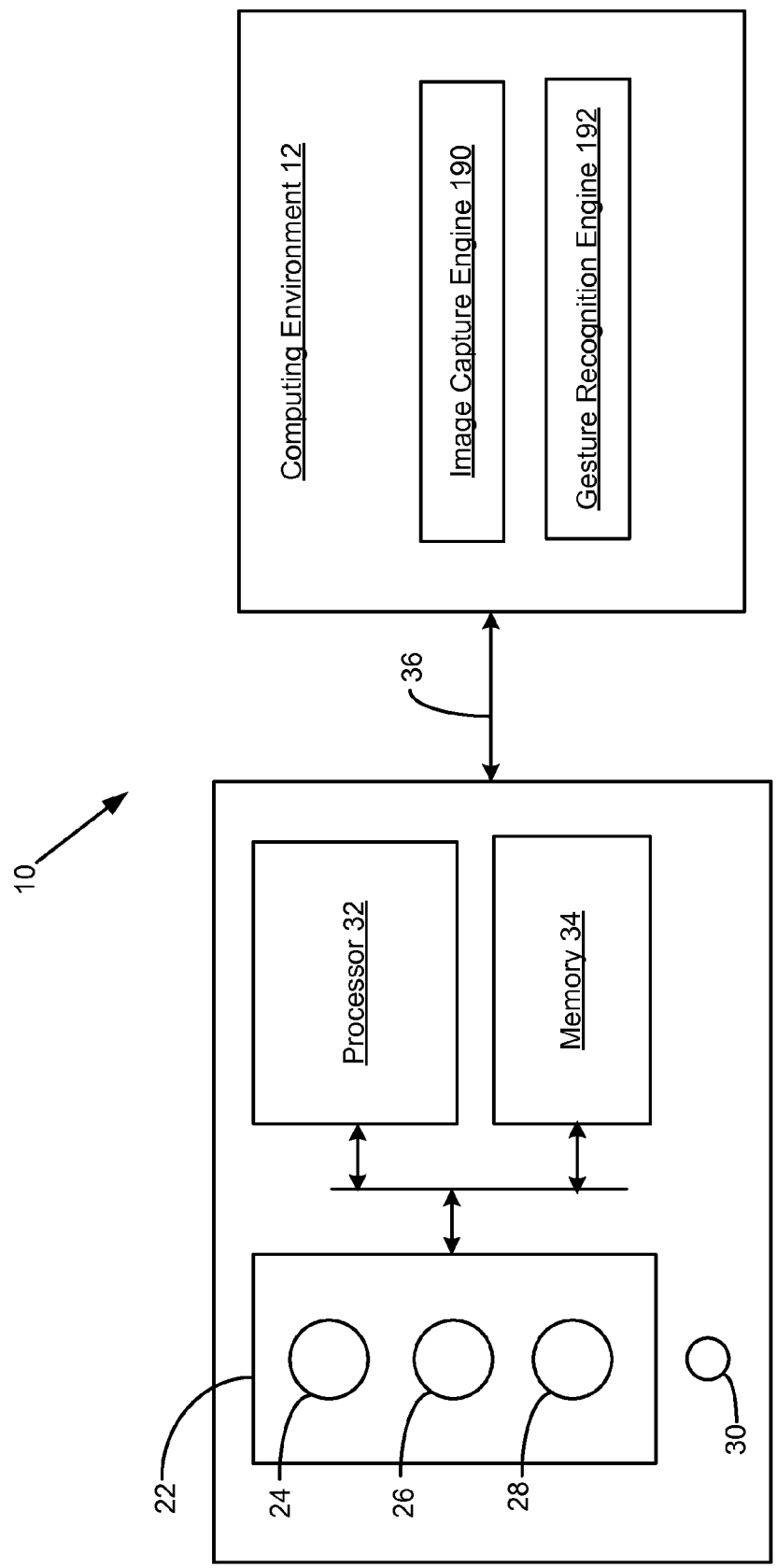
FIG. 2 illustrates an example embodiment of a capture device that may be used in a target recognition, analysis, and tracking system.

Referring initially to FIGS. 1A-2, one example of hardware for implementing the present technology includes a target recognition, analysis, and tracking system 10 which may be used to recognize, analyze, and/or track a human target such as the users 18. Embodiments of the target recognition, analysis, and tracking system 10 include a computing device 12 for executing a gaming or other application. The computing device 12 may include hardware components and/or software components such that computing device 12 may be used to execute applications such as gaming and non-gaming applications. In one embodiment, computing device 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to body and hand movements and/or gestures and speech of one or more users, which information is received by the computing environment and used to render, interact with and/or control aspects of a gaming or other application. The capture device 20 may also be used to capture and store a still frame or video image of users 18 and/or other objects within the FOV. Examples of the computing device 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing device 12 may include a video adapter such as a graphics card and/or an audio adapter such as a sound card that may provide audio/visual signals associated with the game or other application. The A/V device 16 may receive the audio/visual signals from the computing device 12 and may then output the game or application visuals and/or audio associated with the audio/visual signals to the user 18. According to one embodiment, the audio/visual device 16 may be connected to the computing device 12 via, for example, an S-Video cable, a coaxial cable, an HDMI cable, a DVI cable, a VGA cable, a component video cable, or the like.

In embodiments, the computing device 12, the A/V device 16 and the capture device 20 may cooperate to render an avatar or on-screen character on display 14. The one or more users' movements are tracked and used to animate the movements of the corresponding on-screen avatars. In embodiments, the avatar(s) mimic the movements of the user(s) 18 in real world space so that the user(s) 18 may perform movements and gestures which control the movements and actions of the avatar(s) on the display 14.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009; U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

FIG. 2 illustrates an example embodiment of the capture device 20 that may be used in the target recognition, analysis, and tracking system 10. In an example embodiment, the capture device 20 may be configured to capture image data having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects in the scene.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user 18. Other sensor systems may be used in further embodiments, such as for example an ultrasonic system capable of detecting x, y and z axes.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing device 12 in the target recognition, analysis, and tracking system 10. Additionally, the microphone 30 may be used to receive audio signals that may also be provided by the user to control applications such as game applications, non-game applications, or the like that may be executed by the computing device 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing device 12 via a communication link 36. The communication link 36 may be a wired connection including, for example, a USB connection, a Firewire connection, an Ethernet cable connection, or the like and/or a wireless connection such as a wireless 802.11*b, g, a*, or *n* connection. According to one embodiment, the computing device 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. With the aid of these devices, a partial skeletal model may be developed in accordance with the present technology, with the resulting data provided to the computing device 12 via the communication link 36.

It is known that various gaming and other applications may include software routines for taking a picture or video of the one or more users 18 and/or objects within the FOV by capture device 20. This image or video may then be stored and/or played back to the users 18. As opposed to being a routine in a larger software application, the software application itself may be dedicated to taking a picture or video of the one or more users 18 and/or objects within the FOV by capture device 20. Whether a routine in a larger application, or the dedicated function of an application, such applications may include a software engine in accordance with the present disclosure referred to herein as an image capture engine 190. One embodiment of the operation of image capture engine 190 is explained below with respect to the flowchart of FIG. 3 and the illustrations of FIGS. 1A and 1B. Although not critical to the system of the present disclosure, the computing device 12 may further include a gesture recognition engine 192 for recognizing gestures, as explained for example in one or more of the above-incorporated applications.

Figure 3:
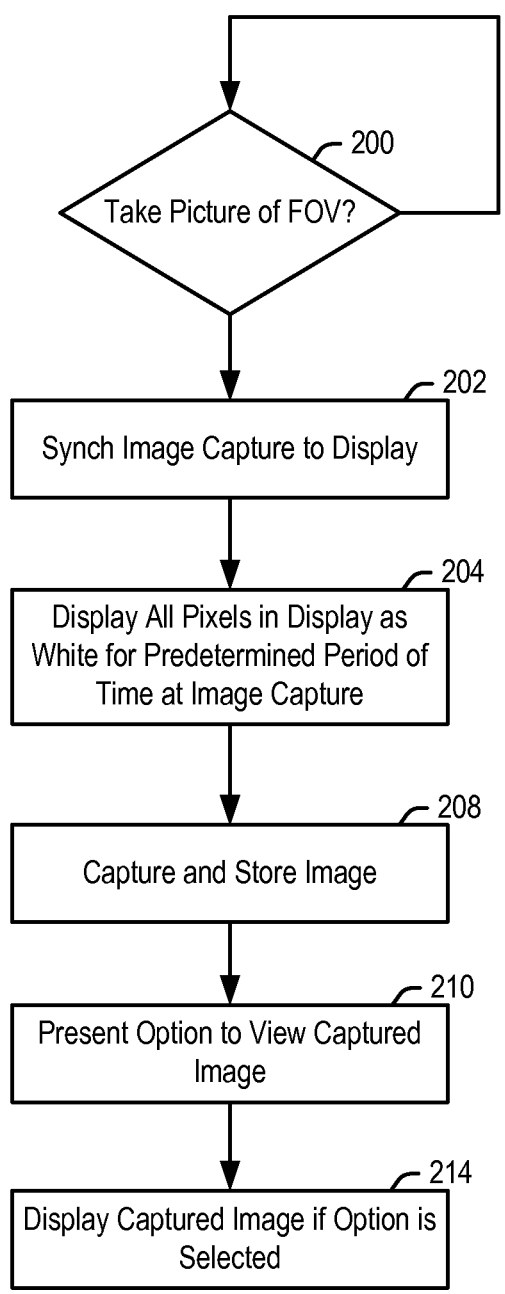
FIG. 3 is a flowchart of an example embodiment of an image capture engine in accordance with the present disclosure.
Figure 4:
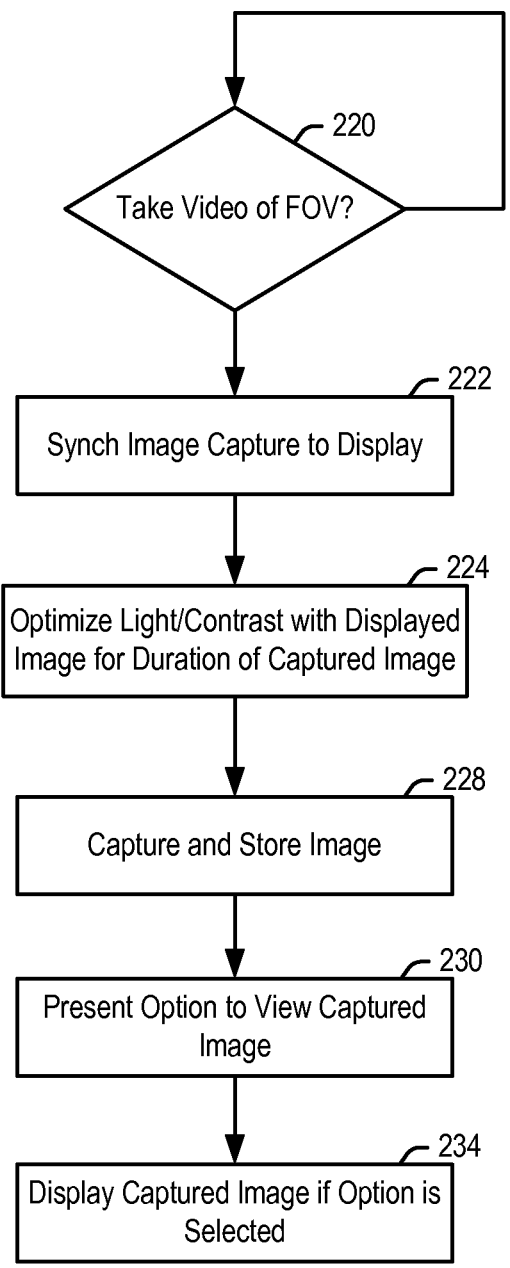
FIG. 4 is a flowchart of another example embodiment of an image capture engine in accordance with the present disclosure.
Figure 5:
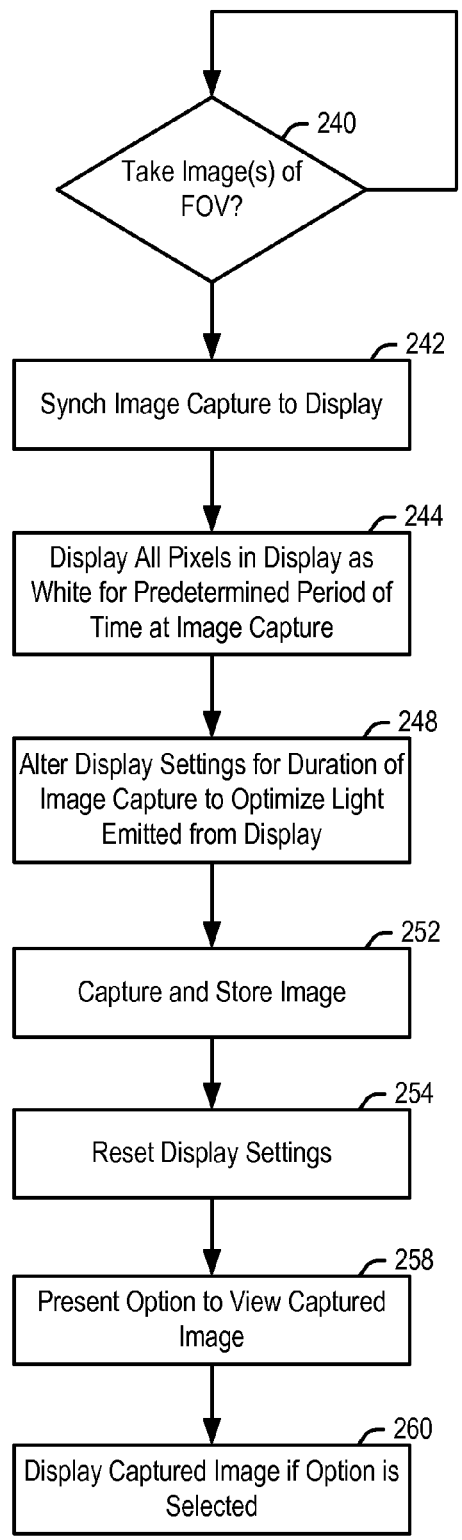
FIG. 5 is a flowchart of a further example embodiment of an image capture engine in accordance with the present disclosure.
Figure 6:
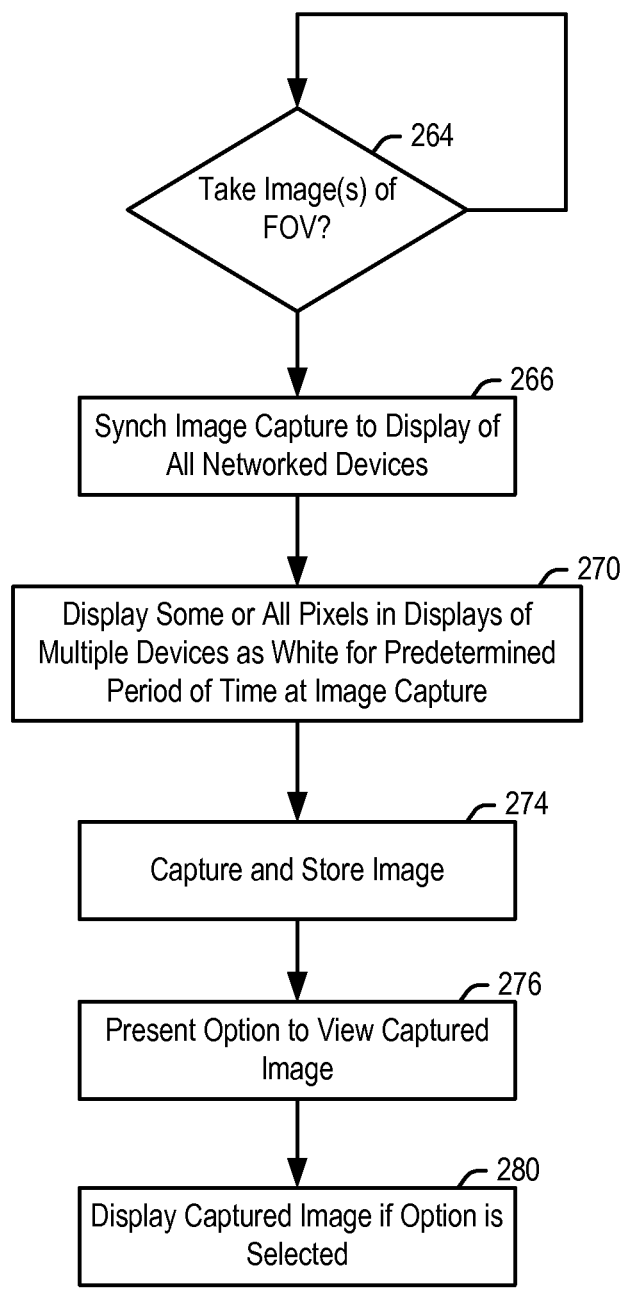
FIG. 6 is a flowchart of another example embodiment of an image capture engine in accordance with the present disclosure.

Referring now to the flowchart of FIG. 3, the image capture engine 190 may take a picture, i.e., capture a frame of image data, of the FOV in step 200. Prior to taking the picture, the image capture engine 190 may indicate to the user(s) 18 that a picture is about to be taken so that the user(s) 18 may pose for the picture. The users may optionally be displayed on the display 14 as shown in FIG. 1A, so that the users may see how they are to appear in the picture to be taken.

In step 202, the image capture device 20 may be time-synched to the A/V device 16. This enables the display 14 of the A/V device 16 to flash all pixels to white light at the same instance in time that the frame of image data is captured. In embodiments, the synchronization may happen automatically, for example as a result of the capture device 20 and A/V device 16 running off of a common clock, for example resident in the computing device 12. In further embodiments, the capture device 20 and A/V device 16 may run off of separate clocks, which may be synchronized to each other by known synchronization methods so that the image capture and flash occur at the same instance in time. The synchronization step 202 may occur at any time prior to the taking of a picture as explained below.

In step 204, at the time the picture is taken, the image capture engine 190 may cause the computing device 12 to send a signal to the A/V device 16 to change the color fill of each pixel on the display 14 to white light. As one example, the colors red, blue and green may be enabled in a pixel to result in white light. As shown for example in FIG. 1B, setting each pixel in the display to white increases the illumination of the FOV in a manner analogous to the flash on a camera. It is understood that the pixels need not be set to pure white, and that shades of gray may be used instead which still increase the illumination output by the display 14.

The duration of the change of the color fill of each pixel to white may be shorter than, the same duration as or longer than the time it takes to capture a frame of image data. After that duration, the computing device 12 may again change the color fill of each pixel back to a display directed by the application then running on the computing device 12.

In embodiments, all pixels on the display are changed to white light in step 204. However, it is contemplated that some percentage of pixels less than 100% may be changed to white light in step 204 in further embodiments. The pixels that change to white in this embodiment may be from a separate area of the display than the pixels that do not change. Alternatively, the pixels that change in this embodiment may be interspersed in any desired pattern with the pixels that do not change.

It is known in photography to illuminate a flash one or more times just prior to the synchronized image capture and final flash. The purpose of this is to shrink the pupils of the subjects' eyes, thereby reducing the effect known as red eye. In embodiments, the display may flash white light one or more times just prior to the step 204 to reduce red eye. This red eye reduction step may alternatively be omitted.

Concurrently with step 204, the image capture device 20 may capture the FOV in step 208, illuminated by the display 16. The captured image may also be stored in step 208. In embodiments, the image need not be stored. In step 210, the image capture engine 190 may present the user(s) 18 with an option to view the captured image. The user(s) 18 may respond via a predefined NUI gesture. The captured image may be displayed on display 16 to the user(s) 18 in step 214, depending on the response in step 210. Step 210, or both steps 210 and 214, may be omitted in further embodiments. The user(s) 18 may thereafter interact with the image capture engine 190 via predefined gestures to store or delete the captured image, to transmit the captured image to friends of the user's or a central storage location, and/or to take a new image.

In addition to illuminating the capture of a single frame of image data, the system of the present disclosure may also provide illumination for multiple frames of video image data. Such an embodiment is described with reference to the flowchart of FIG. 4. In step 220, the image capture engine 190 detects whether a video is to be captured, and in step 222, the image capture device is synchronized with the A/V device, both as described above.

In step 224, the brightness and/or contrast of the display is optimized with a displayed image for the duration of the captured image. In particular, when capturing a single frame of image data as described in FIG. 3, the pixels of the display may all go to white light for that one frame, and then return the display to the previously displayed image. However, where multiple frame video images are captured as described in FIG. 4, the pixels of the display may need to go to white light for a prolonged period of time, which can interfere with displaying images on the display.

One solution is to have the pixels of the display remain illuminated with white light in step 224 for the duration of the image capture, and then return the display to displaying images thereafter. Another solution is to have less than 100% of the pixels go to white light in step 224, with the remaining pixels displaying an image. Another solution is to keep the image as is on the display 14 (no pixels go to white), but increase the contrast of the displayed image, thus increasing the illumination produced by the display 14.

In step 228, the image may be captured concurrently with steps 224 and optionally stored as described above. In step 230, the user(s) 18 may be presented with an option to view a captured image, and the image may be presented to the user in step 234 if the option is selected in step 230.

In the above-described embodiments, illumination from display 14 is increased by setting the color of the pixels of the display to white. In a further embodiment described with respect to the flowchart of FIG. 5, the settings of the A/V device 16 relating to brightness and/or contrast may also be altered to increase the luminance with which each pixel gives off the white light. This may be used for example where the computing device 12 is incorporated into the A/V device 16. In step 240, the image capture engine 190 detects whether an image is to be captured, and in step 242, the image capture device is synchronized with the A/V device, both as described above.

In step 244, some or all of the pixels on display 14 are set to white at a time when an image is to be captured as described above. Further, in accordance with this embodiment, one or more of the A/V device display settings is also altered in step 248 when an image is to be captured. These altered settings may include the brightness, or black level setting, and/or the contrast setting of the A/V device 16. In particular, by increasing the brightness and/or contrast setting, this may further increase the illumination output by the A/V device 16. In some examples of this embodiment, the step 244 of setting the pixels to white may be omitted.

In step 252, the image may be captured concurrently with steps 244 and 248 and optionally stored as described above. After the image is captured, the display settings altered in step 248 may be reset to their prior settings in step 254. In step 258, the user(s) 18 may be presented with an option to view a captured image, and the image may be presented to the user in step 260 if the option is selected in step 258.

In the embodiments described above, there is a single A/V device 16 which enhances the illumination of the FOV, for example by turning the pixels of the display 14 to white. In a further embodiment described with respect to the flowchart of FIG. 6, there may be two or more display devices. In step 264, the image capture engine 190 detects whether an image is to be captured, and in step 266, the image capture device is synchronized with the A/V device, both as described above.

In step 270, some or all pixels in the multiple displays may be set to white. In one example, there may be multiple A/V devices 16, each having a display 14 and each controlled by the computing device 12. In such embodiments, all displays 14 may have their pixels go white for the duration of an image capture. Alternatively, one or more displays may have their pixels go white, while one display continues to display an image in accordance with the application running on computing device 12. The multiple display devices may share the display of an image and the display of white pixels at image capture in other ways in further embodiments.

It is known that multiple devices may be networked together, and that one or more devices may be paired together, so as to share responsibilities between the devices. The pairing of devices for this purpose is described for example in U.S. patent application Ser. No. 12/820,982, entitled, "System for Interaction of Paired Devices," filed Jun. 22, 2010, which application is assigned to the owner of the current application, and which application is incorporated by reference herein in its entirety. In a further example of the system of the present disclosure, one or more additional computing devices having a display may be paired with the system 10 described above. Such an example is shown in FIG. 1C, where a laptop computing device 19 is paired with the system 10.

In such an example, the paired device 19 may assist the A/V device 16 in the illumination of the FOV and/or display of images. In the example shown in FIG. 1C, the pixels of the display of the laptop 19 also go to white at the same time as the pixels in the display 14 to assist in the illumination of the FOV. In a further example one of the laptop 19 display and the display 14 may go to white, while the other displays an image. The laptop 19 display and the display 14 may share the display of an image and the display of white pixels at image capture in other ways in further embodiments.

In step 274, the image may be captured concurrently with step 270 and optionally stored as described above. In step 276, the user(s) 18 may be presented with an option to view a captured image, and the image may be presented to the user in step 280 if the option is selected in step 258.

Figure 7A:
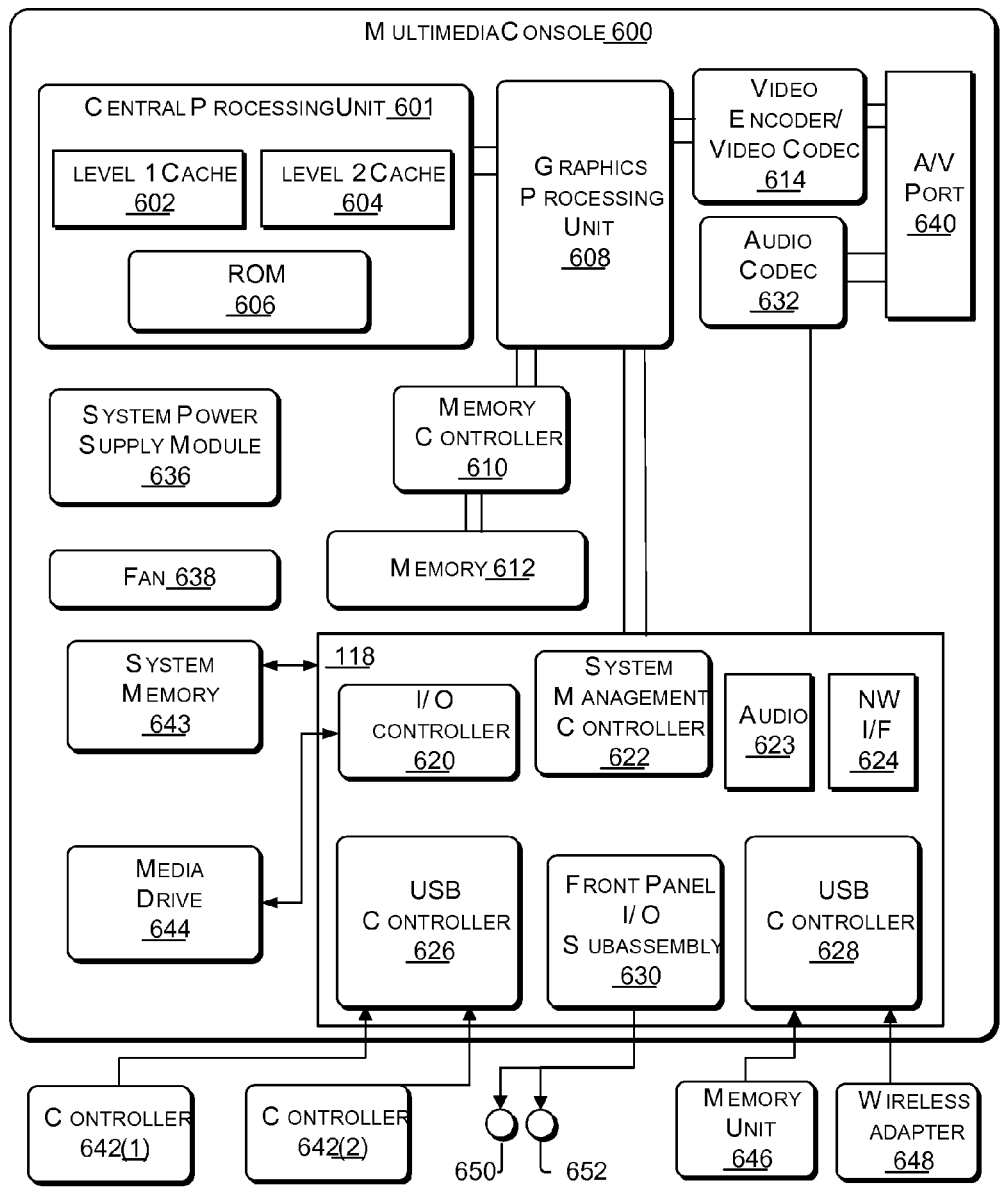
FIG. 7A illustrates an example embodiment of a computing environment that may be used to interpret one or more gestures in a target recognition, analysis, and tracking system.

FIG. 7A illustrates an example embodiment of a computing environment that may be used to interpret one or more positions and motions of a user in a target recognition, analysis, and tracking system. The computing environment such as the computing device 12 described above with respect to FIGS. 1A-2 may be a multimedia console 600, such as a gaming console. As shown in FIG. 7A, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. The CPU 601 may be provided having more than one core, and thus, additional level 1 and level 2 caches 602 and 604. The flash ROM 606 may store executable code that is loaded during an initial phase of a boot process when the multimedia console 600 is powered ON.

A graphics processing unit (GPU) 608 and a video encoder/video codec (coder/decoder) 614 form a video processing pipeline for high speed and high resolution graphics processing. Data is carried from the GPU 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, such as, but not limited to, a RAM.

The multimedia console 600 includes an I/O controller 620, a system management controller 622, an audio processing unit 623, a network interface controller 624, a first USB host controller 626, a second USB host controller 628 and a front panel I/O subassembly 630 that are preferably implemented on a module 618. The USB controllers 626 and 628 serve as hosts for peripheral controllers 642(1)-642(2), a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a Bluetooth module, a cable modem, and the like.

System memory 643 is provided to store application data that is loaded during the boot process. A media drive 644 is provided and may comprise a DVD/CD drive, hard drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 600 is powered ON, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community.

When the multimedia console 600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 642(1) and 642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 7B:
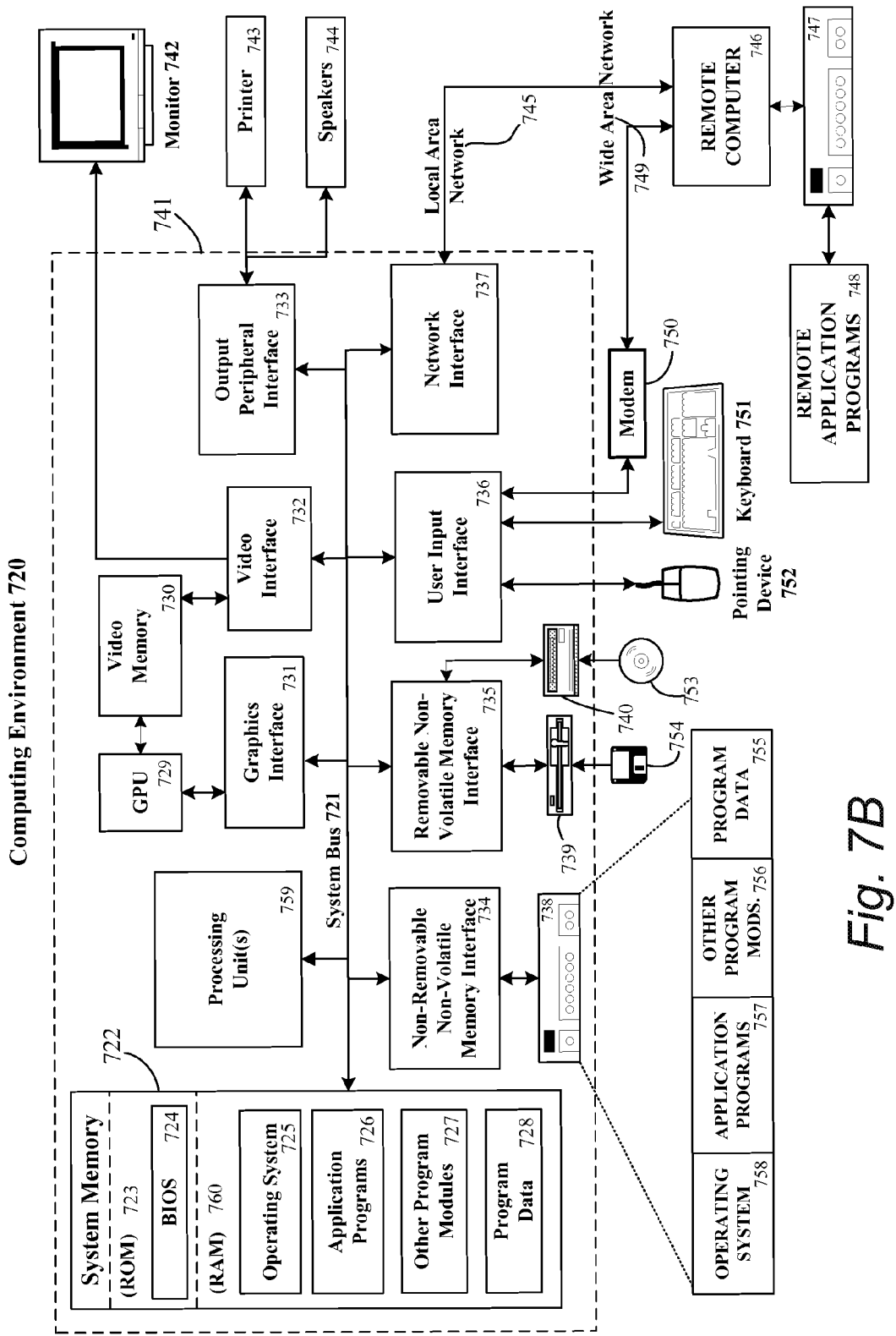
FIG. 7B illustrates another example embodiment of a computing environment that may be used to interpret one or more gestures in a target recognition, analysis, and tracking system.

FIG. 7B illustrates another example embodiment of a computing environment 720 that may be the computing device 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7B, the computing environment 720 comprises a computer 741, which typically includes a variety of computer readable media. Computer readable media can be any available media that can be accessed by computer 741 and includes both volatile and nonvolatile media, removable and non-removable media. The system memory 722 includes computer storage media in the form of volatile and/or nonvolatile memory such as ROM 723 and RAM 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 7B illustrates operating system 725, application programs 726, other program modules 727, and program data 728. FIG. 7B further includes a graphics processor unit (GPU) 729 having an associated video memory 730 for high speed and high resolution graphics processing and storage. The GPU 729 may be connected to the system bus 721 through a graphics interface 731.

The computer 741 may also include other removable/non-removable, volatile/nonvolatile computer storage media. By way of example only, FIG. 7B illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7B, provide storage of computer readable instructions, data structures, program modules and other data for the computer 741. In FIG. 7B, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and a pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). The cameras 26, 28 and capture device 20 may define additional input devices for the console 700. A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 7B. The logical connections depicted in FIG. 7B include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 7B illustrates remote application programs 748 as residing on memory device 747. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of illuminating a field of view of a capture device to capture an illuminated image, comprising:
    (a) capturing an image of the field of view with the capture device;
    (b) increasing the illumination output from a first display device associated with the field of view at the same time the image is captured in said step (a), increasing the illumination output from the display device increasing the illumination of the captured image of the field of view; and
    (c) setting pixels of a second display device associated with the field of view to white at the same time the image is captured in said step (a), the setting of the pixels of the first and second display devices to white increasing the illumination of the captured image of the field of view.

2. The method of claim 1, said step (b) of increasing the illumination output from a display device comprising the step of setting pixels of the display device to white.

3. The method of claim 1, said step (a) of capturing an image of the field of view comprising the step of capturing a single frame of image data.

4. The method of claim 1, said step (a) of capturing an image of the field of view comprising the step of capturing multiple, consecutive frames of image data.

5. The method of claim 4, said step (b) of increasing the illumination output from a display device comprising the step of setting all of the pixels of the display to white.

6. The method of claim 4, said step (b) of increasing the illumination output from a display device comprising the step of setting a first group of pixels of the display to white and a second group of pixels, separate from the first group of pixels, displaying an image.

7. The method of claim 6, wherein the first and second groups of pixels are separated from each other.

8. The method of claim 6, wherein the first and second groups of pixels are interspersed with each other.

9. The method of claim 1, further comprising the step (d) of increasing at least one of a brightness and contrast setting of the display device at the same time the image is captured in said step (a).

10. The method of claim 1, wherein the first and second display devices are controlled by a common computing device.

11. The method of claim 1, wherein the first and second display devices are associated with first and second computing devices, respectively, the first and second computing devices being paired with each other.

12. A method of illuminating a field of view of a capture device to capture an illuminated image, comprising:
    (a) configuring a computing device to enable a first display device to alter a display at the same time the capture device captures an image;
    (b) configuring the computing device to set the display of the first display device to white at the same time as a capture of an image of the field of view by the capture device; and
    (c) configuring the computing device to enable a second display device to alter a display at the same time the capture device captures the image, and configuring the computing device to set the display of the second display device to white at the same time as the capture of the image of the field of view by the capture device.

13. The method of claim 12, further comprising the step (e) of configuring the computing device to increase at least one of the brightness setting and contrast setting of the display device at the same time as the capture of the image of the field of view by the capture device.

14. A method of illuminating a field of view of a capture device to capture an illuminated image, comprising:
    (a) configuring a first computing device to enable a first display device to alter a display at the same time the capture device captures an image;
    (b) configuring the first computing device to set the display of the first display device to white at the same time as a capture of an image of the field of view by the capture device; and
    (c) configuring the first computing device to control a second display of a second computing device to turn white at the same time as the capture of the image of the field of view by the capture device.

15. One or more processor readable storage devices having processor readable code embodied on said processor readable storage devices, said processor readable code for programming one or more processors to perform a method comprising:
    (a) capturing an image of the field of view with the capture device;
    (b) setting pixels of a first display device associated with the field of view to white at the same time the image is captured in said step (a), the setting of the pixels to white increasing the illumination of the captured image of the field of view; and
    (c) setting pixels of a second display device associated with the field of view to white at the same time the image is captured in said step (a), the setting of the pixels of the first and second display devices to white increasing the illumination of the captured image of the field of view.

16. The one or more processor readable storage devices of claim 15, said step (b) of setting pixels of a display device associated with the field of view to white comprising the step of setting all of the pixels of the display device to white.

17. The one or more processor readable storage devices of claim 15, further comprising the step (c) of increasing at least one of a brightness and contrast setting of the display device at the same time the image is captured in said step (a).

* * * * *